(12) United States Patent
Li et al.

(10) Patent No.: US 11,731,137 B2
(45) Date of Patent: Aug. 22, 2023

(54) FERTILIZER GRINDING MECHANISM, WATER AND FERTILIZER MIXING DEVICE, AND AQUEOUS FERTILIZER SOLUTION PREPARATION PRODUCTION LINE

(71) Applicants: QINGDAO UNIVERSITY OF TECHNOLOGY, Shandong (CN); HANERGY (QINGDAO) LUBRICATION TECHNOLOGY CO., LTD., Shandong (CN)

(72) Inventors: Changhe Li, Qingdao (CN); Yue Lu, Qingdao (CN); Zongming Zhou, Qingdao (CN); Xiaochu Liu, Qingdao (CN); Mingzheng Liu, Qingdao (CN); Xiaoming Wang, Qingdao (CN); Xiaowei Zhang, Qingdao (CN); Mingcun Shi, Qingdao (CN); Bingheng Lu, Qingdao (CN)

(73) Assignees: QINGDAO UNIVERSITY OF TECHNOLOGY, Shandong (CN); HANERGY (QINGDAO) LUBRICATION TECHNOLOGY CO., LTD., Shandong (CN)

( * ) Notice: Subject to any disclaimer, the term of this patent is extended or adjusted under 35 U.S.C. 154(b) by 106 days.

(21) Appl. No.: 17/541,059

(22) Filed: Dec. 2, 2021

(65) Prior Publication Data
US 2023/0034460 A1 Feb. 2, 2023

(30) Foreign Application Priority Data
Jul. 28, 2021 (CN) .......................... 202110857191.3

(51) Int. Cl.
B02C 4/10 (2006.01)
B02C 4/12 (2006.01)
(Continued)

(52) U.S. Cl.
CPC ................ *B02C 4/12* (2013.01); *B01F 23/53* (2022.01); *B02C 4/286* (2013.01); *B02C 4/34* (2013.01);
(Continued)

(58) Field of Classification Search
CPC .. B02C 4/10; B02C 4/12; B02C 4/286; B02C 4/34; B02C 4/44; B02C 4/28; B02C 4/36; B02C 23/38; C05G 1/00
See application file for complete search history.

(56) References Cited

FOREIGN PATENT DOCUMENTS

| CN | 2937120 Y | * | 8/2007 | |
| CN | 102060593 A | * | 5/2011 | ............... C05G 1/00 |

(Continued)

*Primary Examiner* — Faye Francis
(74) *Attorney, Agent, or Firm* — Oliff PLC

(57) ABSTRACT

A fertilizer grinding mechanism, a water and fertilizer mixing device, and an aqueous fertilizer solution preparation production line. A fertilizer receiving body, where an edge is provided with a arranged first channel; a connecting body, fixed to a bottom of the fertilizer receiving body and provided with a second channel with the first channel, a bottom of the second channel is communicated with a buffer bin, a pushing block is arranged in the buffer bin, and the pushing block is connected with a drive mechanism for driving the block to move in direction of the body; and an inner grinding block, where the block is fixed to a bottom of the connecting body, an outer side of the inner grinding block is with a vertically movable grinding roller, the pushing block can push fertilizer under vertical movement of the roller. The grinding mechanism has a heat dissipation effect.

10 Claims, 12 Drawing Sheets

(51) Int. Cl.
   *B01F 23/53*     (2022.01)
   *B02C 4/28*      (2006.01)
   *B02C 4/34*      (2006.01)
   *B02C 4/44*      (2006.01)
   *B02C 23/18*     (2006.01)
   *B01F 101/32*    (2022.01)

(52) U.S. Cl.
   CPC ............... *B02C 4/44* (2013.01); *B02C 23/18* (2013.01); *B01F 2101/32* (2022.01)

(56) References Cited

FOREIGN PATENT DOCUMENTS

| | | | | |
|---|---|---|---|---|
| CN | 202492472 U | * | 10/2012 | ............... C05G 3/00 |
| CN | 202705259 U | * | 1/2013 | |
| CN | 105481487 A | * | 4/2016 | ............... C05G 5/12 |
| CN | 105859341 A | * | 8/2016 | ............... C05G 1/00 |
| CN | 106475007 A | * | 3/2017 | ............. B02C 23/08 |
| CN | 108855394 A | * | 11/2018 | |

\* cited by examiner

FERTILIZER GRINDING MECHANISM, WATER AND FERTILIZER MIXING DEVICE, AND AQUEOUS FERTILIZER SOLUTION PREPARATION PRODUCTION LINE

TECHNICAL FIELD

The present invention relates to the technical field of agricultural equipment, and in particular to a fertilizer grinding mechanism, a water and fertilizer mixing device, and an aqueous fertilizer solution preparation production line.

BACKGROUND

Descriptions herein only provide background techniques related to the present invention, and do not necessarily constitute the related art.

To prepare an aqueous fertilizer solution, it is necessary to mix the fertilizer and water. At present, a certain amount of fertilizer is directly dissolved in water to achieve mixing of the fertilizer and water. The inventors found that the speed at which a certain amount of material is directly dissolved in water is slow, which easily leads to problems such as incomplete dissolution and uneven solution concentration; in contrast, the material can be more easily and rapidly dissolved in water after being ground into powder. During grinding, the grinding roller squeezes, shears and grinds processed materials for a long time in the working process, which makes the surface temperature of the grinding roller gradually increase. Such an increased temperature not only destroys the compositions of the materials, but also causes the materials to burn and stick to the surface of the grinding roller, affecting the normal operation of the grinding roller and reducing the service life of the grinding device. Therefore, how to effectively reduce the surface temperature of the grinding roller is an urgent problem to be solved.

At present, one method is to use the water cooling device to reduce the surface temperature of the grinding roller, thereby reducing the temperature of the materials being ground. The water cooling device has such a structure that cold water flows through the inside of the grinding roller to take away heat. Such a water cooling device can reduce the temperature of the materials being ground, and its components can be easily assembled together. However, the inventor found that in this way, the material is continuously ground between the grinding rollers and will remain in the grinding state, without buffer gap, and the heat dissipation effect is not good. Another cooling method is to increase the heat dissipation device to reduce the temperature. This method increases the cost on one hand; on the other hand, because the heat dissipation device is always located outside the grinder, direct heat dissipation cannot be achieved.

Conventional aqueous fertilizer solution preparation production lines have the problems of inaccurate concentration of the aqueous fertilizer solution and low effective utilization rate of chemical fertilizer. Meanwhile, the excessive use of chemical fertilizer easily leads to accumulation of heavy metal pollution, reduction of microbial activity, difficulty in conversion and utilization of nutrient substances, nutrient imbalance, salt accumulation, acid-base imbalance, etc.

The following methods are generally adopted for controlling the concentration of the solution. In a first method, the input amount of the solution is directly controlled by a servo motor. When the solution is needed, the servo motor is controlled to work. The total input amount of the solution is obtained according to the flow rate in the pipeline. The inventors found that such a method has a defect that the amount of the solution cannot be controlled accurately by this device, which will result in an inaccurate concentration of the prepared solution. In a second method, devices such as a concentration sensor are adopted to detect the concentration of the solution after the solution is prepared. The inventors found that during working of this device, when the nutrient solution is diluted, operations such as stirring are often required to ensure that the concentration of the solution in the tank can be kept consistent, but the entire device is still working when the sensor is transmitting the detected concentration, and eventually the concentration of the solution is changed. In a third method, a valve is adopted to control the flow input. The inventors found that this method is also achieved by calculating the amount of the solution according to the flow rate of the solution in the pipeline and time. When a more precise amount of the solution is required, the diameter of the pipeline needs to be changed. However, when the diameter of the pipeline is too small, a series of problems such as blockage will occur.

SUMMARY

The objectives of the present invention are to overcome the shortcomings of the prior art and provide a fertilizer grinding device, so as to ensure a better heat dissipation effect during grinding.

In order to realize the above objectives, the present invention adopts the technical scheme as follows:

In a first aspect, the embodiments of the present invention provide a fertilizer grinding mechanism, including:

a fertilizer receiving body, where an edge of the fertilizer receiving body is provided with a vertically arranged first channel;

a connecting body, where the connecting body is fixed to a bottom of the fertilizer receiving body and provided with a second channel communicated with the first channel, a bottom of the second channel is communicated with a buffer bin, a pushing block is arranged in the buffer bin, and the pushing block is connected with a drive mechanism for driving the pushing block to move in a radial direction of the connecting body;

an inner grinding block, where the inner grinding block is fixed to a bottom of the connecting body, an outer side of the inner grinding block is provided with a vertically movable grinding roller, the pushing block can push fertilizer falling into the buffer bin to a gap between the inner grinding block and the grinding roller so that the fertilizer is ground under vertical movement of the grinding roller.

Optionally, the drive mechanism includes a pushing column, a top end of the pushing column is connected with a first vertical drive member, the pushing column is hinged to one end of a pull rod, the other end of the pull rod is hinged to the pushing block, a bottom end of the pushing column can be in contact with the pushing block via an arc surface so that vertical movement of the pushing column can be converted into movement of the pushing block in the radial direction of the connecting body.

Optionally, a second vertical drive member is fixed to an outer peripheral surface of the connecting body, the second vertical drive member is connected with a grinding roller support, and the grinding roller is mounted on the grinding roller support.

Optionally, the second vertical drive member is connected with the grinding roller support via a fine-adjusting mechanism, the fine-adjusting mechanism can drive the grinding roller support to move in the radial direction of the connecting body so that a distance between the grinding roller and an outer side surface of the inner grinding body can be adjusted.

Optionally, cooling liquid flow passages communicated with each other are arranged in the connecting body and the inner grinding block.

In a second aspect, the embodiments of the present invention provide a water and fertilizer mixing device, including a crushing mechanism, the fertilizer grinding mechanism described in the first aspect, a fertilizer dispersing mechanism, and a mixing mechanism.

The crushing mechanism is arranged above the fertilizer grinding mechanism and is configured to crush fertilizer and feed the crushed fertilizer to the fertilizer grinding mechanism, the fertilizer dispersing mechanism is fixed to a top of the mixing mechanism and arranged below the fertilizer grinding mechanism, the fertilizer dispersing mechanism is configured to introduce the ground fertilizer into the mixing mechanism, and the mixing mechanism is configured to mix the ground fertilizer and water.

Optionally, the fertilizer dispersing mechanism adopts a shell structure, the inner grinding block extends into the fertilizer dispersing mechanism, a bottom of the fertilizer dispersing mechanism is of an inverted cone-shaped structure, a bottom end of the inverted cone-shaped structure is provided with a discharge port, and the fertilizer dispersing mechanism is communicated with the mixing mechanism via the discharge port.

In a third aspect, the embodiments of the present invention provide an aqueous fertilizer solution preparation production line, including: the water and fertilizer mixing device described in the second aspect, a solution feeding device, and a solution diluting device arranged in sequence, where the solution feeding device can receive an aqueous fertilizer solution fed from the water and fertilizer mixing device, and feed the aqueous fertilizer solution to the solution diluting device, and the solution diluting device is configured to dilute the aqueous fertilizer solution.

Optionally, the solution feeding device includes a pushing shell, a discharge hole of the pushing shell is communicated with the solution diluting device, a feeding hole is connected with the water and fertilizer mixing device, a pushing member capable of moving along an axis of the pushing shell is arranged in the pushing shell, an elastic member is arranged between the pushing member and the pushing shell, an end of the pushing member extending out of the pushing shell is in sliding contact with a lever via a first sliding groove arranged in the lever, one end of the lever is hinged to a positioning block, the other end of the lever is provided with a second sliding groove, a hinge shaft is slidably connected into the second sliding groove, the hinge shaft is hinged to a first rack, and the first rack is meshed with a rotatable first gear.

Optionally, the aqueous fertilizer solution preparation production line further includes a nutrient solution supply device, where the nutrient solution supply device includes a buffer container, the buffer container is communicated with a discharge pipe, a pushout component is arranged in the buffer container, the pushout component can be in contact with a vertically movable second rack, the second rack can discharge a nutrient solution in the buffer container via the discharge pipe by the pushout component, and the second rack is meshed with a rotatable second gear.

The present invention has the following beneficial effects:

1. According to the grinding device of the present invention, the fertilizer is ground by the outer side surface of the inner grinding block together with the vertical movement of the grinding roller. The inner grinding block does not need to generate friction in the same place all the time, and the fertilizer is not always in the grinding state, which facilitates the heat dissipation of the inner grinding block and the fertilizer. The heat dissipation effect is good, thereby avoiding the defects that fertilizer compositions are destroyed by excessive temperature, and the service life of the grinding roller is shortened because the fertilizer is stuck to the surface of the grinding roller due to burning.

2. The grinding device of the present invention has the drive mechanism and the pushing block. Fertilizer can be automatically fed into the gap between the inner grinding block and the grinding roller via the drive mechanism. The degree of automation is high. The labor intensity of workers is reduced.

3. According to the grinding device of the present invention, the cooling liquid flow passages are further arranged in the inner grinding block and the connecting block. Water cooling can also be carried out, thereby ensuring the heat dissipation effect of the inner grinding block and the fertilizer.

4. According to the production line of the present invention, the solution feeding device includes the first gear, the first rack, the lever, the pushing member, and the pushing shell. The first gear is utilized to drive the first rack to move, and the aqueous fertilizer solution in the pushing shell is discharged via the first rack and the pushing member. The number of turns of the first gear can be controlled to control the stroke of the first rack, so as to achieve precise control of the amount of the aqueous fertilizer solution discharged from the pushing shell, thereby avoiding solution waste.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute a limitation to this application.

Figure 1:
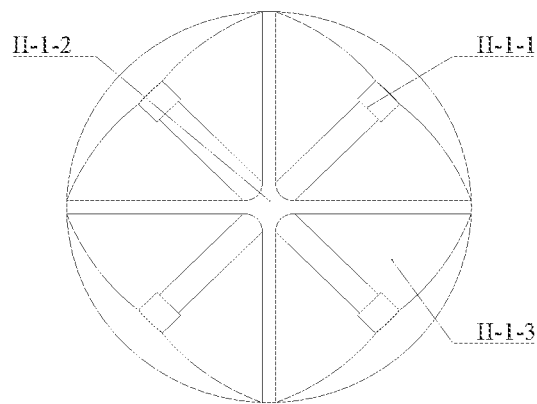
FIG. 1 is a top view of a fertilizer receiving body according to Embodiment 1 of the present invention.

In the figures, I-crushing mechanism, II-fertilizer grinding mechanism, III-mixing mechanism, IV-solution feeding device, V-nutrient solution supply device, and VI-solution diluting device;

I-1—electric motor, I-2—shaft coupler, I-3—feeding pipe, I-4—crushing shaft, I-5—first housing, and I-6—filter screen;

II-1—fertilizer receiving body, II-1-1—first channel, II-1-2—mounting surface, II-1-3—guide surface, II-1-4—threaded connection hole, II-2—connecting body, II-2-1—cooling liquid flow passage, II-2-2—partition block, II-2-3—buffer bin, II-2-4—second channel, II-2-5—air cylinder connection hole, II-3—pushing column, II-3-1—mounting hole, II-3-2—semispherical surface, II-4—pushing block, II-4-1—hinged plate, II-5—inner grinding block, II-5-1—groove, II-5-2—cooling liquid flow passage, II-6—grinding roller, II-7—fertilizer dispersing mechanism, II-7-1—cooling water pipe, II-7-2—discharge hole, II-8—air cylinder, II-9—rodless air cylinder, II-10—fine-adjusting mechanism, II-10-1—connecting shaft, II-10-2—threaded bolt, II-10-3—fine-adjusting block, II-11—bracket, II-12—water suction pump, II-13—water inlet pipe, and II-14—cooling liquid pipeline;

IV-1—solution conveying pipeline, IV-2—solution buffer tank, IV-3—electromagnetic valve, IV-4—flowmeter, IV-5—positioning block, IV-6—pushing shell, IV-7—lever, IV-7-1—hinge hole, IV-7-2—first sliding groove, IV-7-3—second sliding groove, IV-8—pushing member, IV-8-1—pushing piston, IV-8-2—piston rod, IV-8-3—stiffening plate, IV-8-4—baffle, IV-9—spring, IV-10—first rack, IV-11—electric motor, IV-12—shaft coupler, IV-13—worm, IV-14—worm gear, IV-15—first gear, and IV-16—feeding auxiliary mechanism;

V-1—micro-feeding mechanism, V-1-1—second gear, V-1-2—first bevel gear, V-1-3—second bevel gear, V-1-4—second rack, V-1-5—electric motor, V-2—micro-feeding mechanism rotating mechanism, V-2-1—big gear, V-2-2—small gear, V-2-3—electric motor, V-2-4—shaft coupler, V-2-5—rotating disc, V-2-6—rotating shaft, V-3—solution buffer mechanism, V-3-1—feeding auxiliary block, V-3-2—feeding plate, V-3-3—buffer container, V-3-4—pipeline, V-3-3-1—solution baffle, V-3-3-2—central column, V-4—rotating mechanism, V-4-1—rotating auxiliary column, V-4-2—big gear, V-4-3—small gear, V-4-4—shaft coupler, V-4-5—electric motor, V-4-6—shaft, V-4-7—universal wheel, V-5—traveling mechanism, V-5-1—top cover, V-5-2—base, V-5-3—traveling wheel, V-5-4—electric motor, and V-5-5—support frame;

VI-1—second housing, VI-2—stirring frame, VI-3—short stirring blade, VI-4—long stirring blade, VI-5—stirring shaft, VI-6—third bevel gear, VI-7—second bevel gear, VI-8—shaft coupler, VI-9—electric motor, VI-10—water suction pump, VI-11—liquid outlet pipe, VI-12—support block, and VI-13—first bevel gear.

DETAILED DESCRIPTION

Embodiment 1

The present embodiment discloses a fertilizer grinding mechanism II, which includes a fertilizer receiving body II-1, a connecting body II-2, and an inner grinding block II-5 arranged in sequence from top to bottom. An outer side of the inner grinding block is provided with vertically movable grinding rollers. The fertilizer receiving body is configured to receive fertilizer to be ground, and feed the fertilizer to the connecting body. The fertilizer can fall along the connecting body and enter a space between the inner grinding block and the grinding rollers. Vertical movement of the grinding rollers is utilized to grind the fertilizer.

Figure 2:
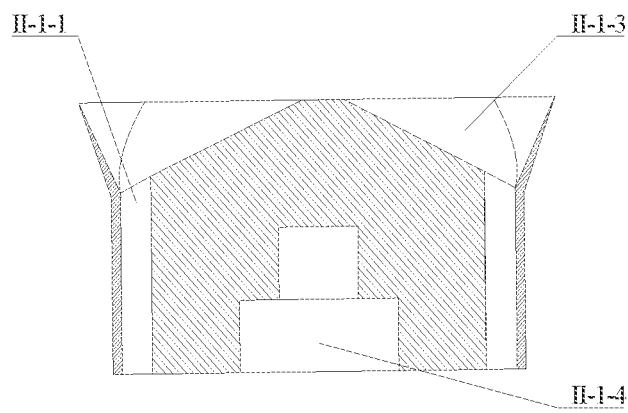
FIG. 2 is a cross-sectional view of the fertilizer receiving body according to Embodiment 1 of the present invention.

As shown in FIG. 1 and FIG. 2, the fertilizer receiving body is of a cylindrical structure. A top of the fertilizer receiving body is provided with an inverted cone-shaped steel plate to facilitate the collection of fertilizer to the connecting body. An edge of the connecting body is provided with a plurality of first channels II-1-1. In the present embodiment, four first channels are provided. The four first channels are evenly distributed along the circumference. Axes of the first channels are vertically arranged to convey fertilizer into the connecting body. In order to allow fertilizer to be collected into the first channels, a top surface of the connecting body on the outer periphery of the first channel is a guide surface II-1-3 inclined towards the first channel. The guide surface is connected to a mounting surface II-1-2. The mounting surface is configured to connect the connecting body with a piece of equipment above the connecting body. The bottom center of the connecting body is provided with a threaded connection hole II-1-4.

Figure 3:
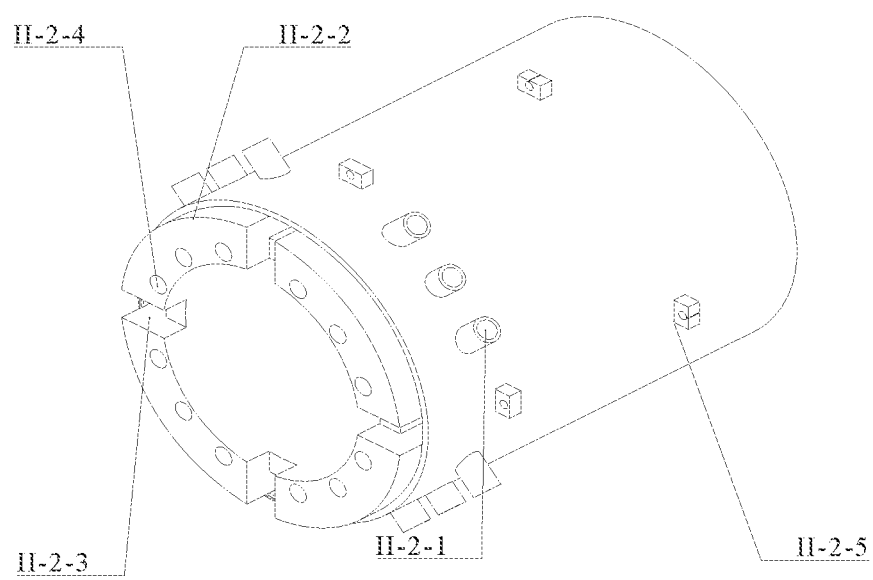
FIG. 3 is an axonometric view of a connecting body according to Embodiment 1 of the present invention.

As shown in FIG. 3, the connecting body also adopts a cylindrical structure. A top surface of the connecting body is fixed to a bottom surface of the fertilizer receiving body. An edge of the connecting body is provided with a plurality of second channels II-2-4 of which axes are vertically arranged. The second channels are communicated with the first channels. In the present embodiment, four second channels are provided. A bottom of the connecting body is provided with four partition blocks II-2-2. Buffer bins II-2-3 communicated with the second channels are formed between adjacent partition blocks. Cooling liquid flow passages II-2-1 are arranged in the connecting body and the partition blocks. A cooling liquid can be introduced into the cooling liquid flow passages.

The fertilizer in the first channels in the fertilizer receiving body can pass through the second channels to enter the buffer bins for storage.

Figure 4:
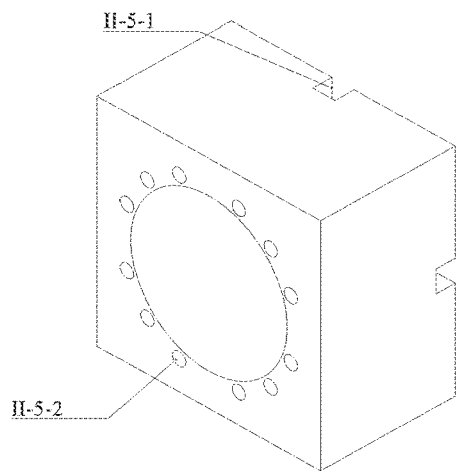
FIG. 4 is a schematic structural view of an inner grinding block according to Embodiment 1 of the present invention.

As shown in FIG. 4, the inner grinding block adopts a cubic block. An upper surface of the inner grinding block is fixed to bottom surfaces of the partition blocks of the connecting body. A top surface of the inner grinding block is provided with four grooves II-5-1. The grooves correspond to the buffer bins in position. The grooves and the buffer bins jointly define a cavity for storing fertilizer. Cooling liquid flow passages II-5-2 run through upper and lower end surfaces of the inner grinding block, are aligned with the cooling liquid flow passages of the partition blocks, and are configured to introduce a cooling liquid into the inner grinding block.

A pushing block II-4 is arranged in the cavity jointly defined by the buffer bins and the grooves. The pushing block is connected with a drive mechanism. The drive mechanism can drive the pushing block to move in a radial direction of the connecting body. Then fertilizer stored in the cavity is pushed to the space between the inner grinding block and the grinding rollers.

Figure 5:
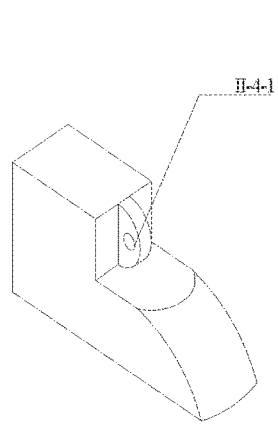
FIG. 5 is a schematic structural view of a pushing block according to Embodiment 1 of the present invention.

As shown in FIG. 5, the pushing block adopts an L-shaped structure, including a vertical portion and a horizontal portion. An inner side surface of the vertical portion is provided with a hinged plate II-4-1. An end plane of the horizontal portion is an arc-shaped surface.

Figure 7:
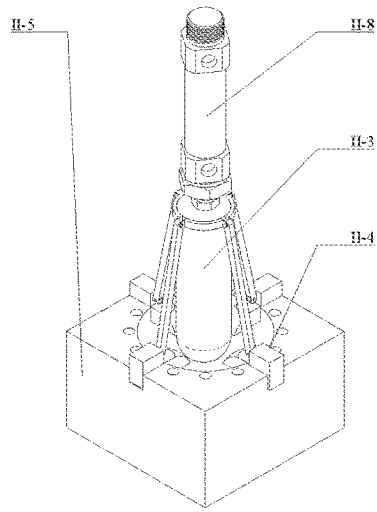
FIG. 7 is a schematic structural view of a drive mechanism according to Embodiment 1 of the present invention.

As shown in FIG. 7, the drive mechanism includes a first vertical drive member. In the present embodiment, the first vertical drive member adopts an air cylinder II-8 of which an axis is vertically arranged. A top of the air cylinder is fixedly connected to the fertilizer receiving body via the threaded connection hole in the bottom of the fertilizer receiving body. A piston rod of the air cylinder is fixedly connected to a top end of a pushing column II-3 via a mounting hole II-3-1 in the top end of the pushing column. The air cylinder can drive the pushing column to lift. The air cylinder and the pushing column are both located in a cylindrical cavity in the middle of the connecting body. Meanwhile, the middle of the inner grinding block is also provided with a cylindrical cavity for the pushing column to move vertically.

Figure 6:
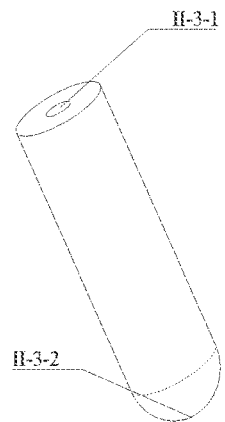
FIG. 6 is a schematic structural view of a pushing column according to Embodiment 1 of the present invention.

As shown in FIG. 6, the top end of the pushing column is hinged to one end of a pull rod. The other end of the pull rod is hinged to the pushing block via a hinged plate. Meanwhile, a bottom surface of the pushing column is a hemispherical surface II-3-2.

The air cylinder drives the pushing column to move downwards, and drives the pushing block to move outwards in the radial direction of the connecting body via the contact between the hemispherical surface and the arc-shaped surface, thereby pushing the fertilizer out of the cavity defined by the buffer bins and the grooves. The air cylinder drives the pushing column to move upwards. Under the action of the pull rod, the pushing block is reset. Fertilizer can fall into the cavity defined by the buffer bins and the grooves again.

Figure 8:
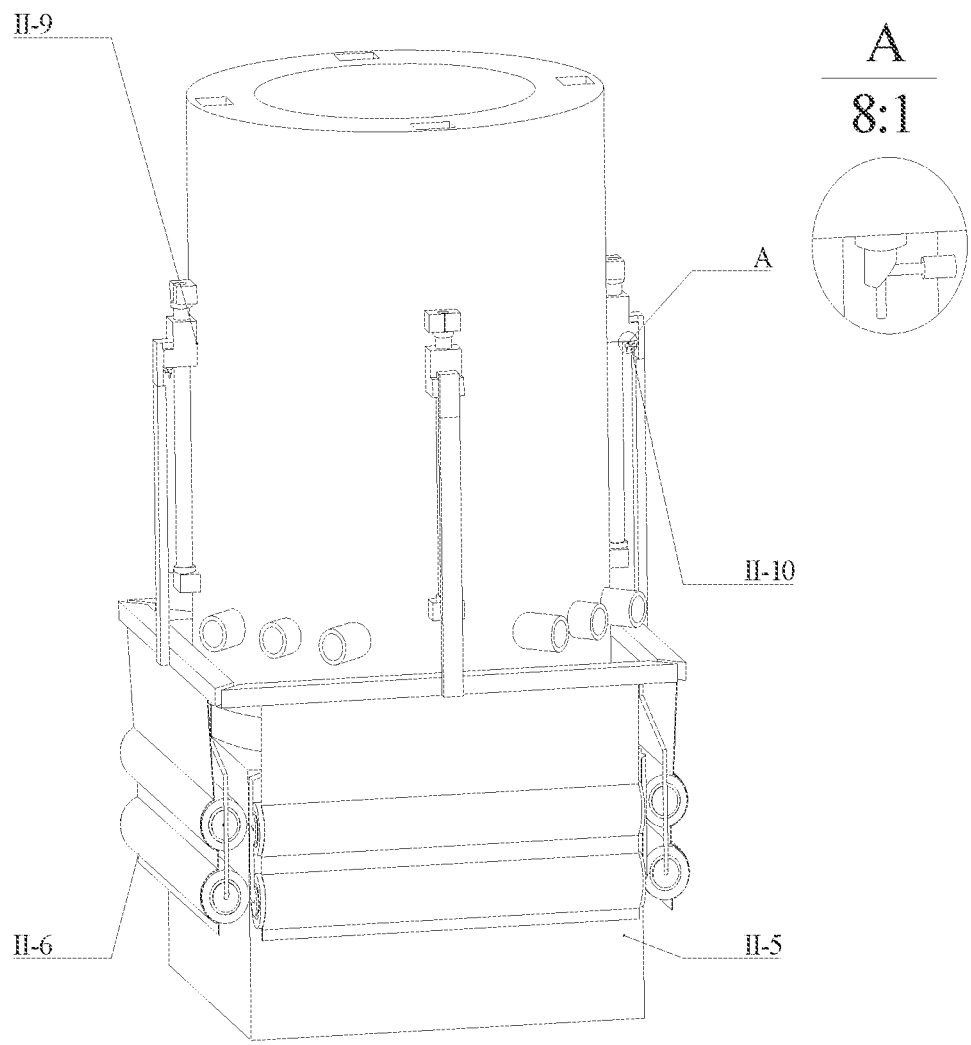
FIG. 8 is a schematic assembly view of the connecting body, the inner grinding block, and a grinding roller according to Embodiment 1 of the present invention.

As shown in FIG. 8, the outer sides of the four sides of the inner grinding block are all provided with grinding rollers II-6. In the present embodiment, the outer side of each side of the inner grinding block is provided with two grinding rollers distributed up and down. The upper grinding roller has a larger diameter than the lower grinding roller. The upper grinding roller having a slightly larger diameter enables the fertilizer to be ground more fully.

The grinding rollers are all rotatably connected with grinding roller supports. The grinding roller supports are connected with a second vertical drive member. The second vertical drive member can drive the grinding rollers to lift vertically via the grinding roller supports.

The grinding roller support is also provided with a baffle to prevent ground fertilizer from spreading to the outside.

In the present embodiment, the second vertical drive member adopts a rodless air cylinder. The rodless air cylinder is fixed to the outer side surface of the connecting body via an air cylinder connection hole II-2-5.

In order to adjust the distance between the grinding roller and the side surface of the inner grinding block and meet the grinding requirements of fertilizer of different particle sizes, the rodless air cylinder is connected to the grinding roller support via a fine-adjusting mechanism II-10.

Figure 9:
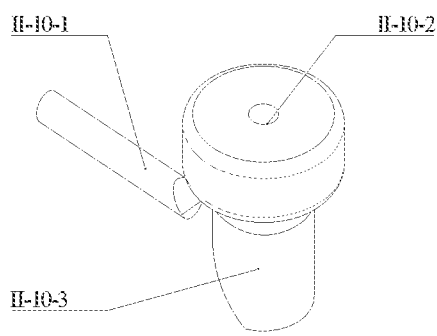
FIG. 9 is a schematic exploded structural view of a fine-adjusting mechanism according to Embodiment 1 of the present invention.

As shown in FIG. 9, in the present embodiment, the fine-adjusting mechanism includes a screw rod. The screw rod is fixedly connected to a driving part of the rodless air cylinder. A top of the grinding roller support is provided with an adjusting groove formed in the radial direction of the connecting body. The screw rod runs through the adjusting groove. Fixing nuts are arranged on the screw rod both above and below the adjusting groove. The grinding roller support and the screw rod are locked and fixed by the fixing nuts. A connecting shaft II-10-1 is also fixed to the grinding roller support. An end face of one end of the connecting shaft close to the screw rod is an inclined surface forming a set angle with an axis of the connecting shaft. A bottom of the screw rod is in threaded connection with a threaded bolt II-10-2. The threaded bolt is rotatably connected with a fine-adjusting block II-10-3. The fine-adjusting block has an inclined surface, and is in contact with the inclined surface of the connecting shaft via the inclined surface.

When it is necessary to finely adjust the position of the grinding roller, the fixing nuts are loosened, the threaded bolt is rotated, and the threaded bolt moves along an axis of the screw rod. Meanwhile, since the surface of the threaded fine-adjusting block in contact with the connecting shaft is the inclined surface, the fine-adjusting block will drive the connecting shaft and the grinding roller support to move in the radial direction of the connecting body, thereby adjusting the distance between the grinding roller and the side surface of the inner grinding block. After a set distance is reached, the fixing nuts can be locked again.

The operating principle of the grinding mechanism of the present embodiment is as follows.

The fertilizer receiving body receives the fertilizer to be ground. Under the guiding action of the guide surface, the fertilizer enters the first channel, passes through the first channel, falls, enters the second channel of the connecting body, passes through the second channel, and enters the buffer bin. The air cylinder drives the pushing column to descend. The pushing column drives the pushing block to move outwards in the radial direction of the connecting body, thereby pushing the fertilizer in the buffer bin into the space between the grinding rollers and the side surface of the inner grinding block. The rodless air cylinder drives the grinding rollers to lift, so as to grind the fertilizer. The ground fertilizer falls via the gap between the grinding rollers and the inner grinding block.

The inner grinding block does not need to generate friction in the same place all the time, and the fertilizer is not always in the grinding state, which facilitates the heat dissipation of the inner grinding block and the fertilizer. The heat dissipation effect is good, thereby avoiding the defects that fertilizer compositions are destroyed by excessive temperature, and the service life of the grinding roller is shortened because the fertilizer is stuck to the surface of the grinding roller due to burning. Meanwhile, the cooling fluid may be introduced into the cooling fluid flow passages of the inner grinding block and the connecting body to further ensure the heat dissipation effect.

Embodiment 2

Figure 10:
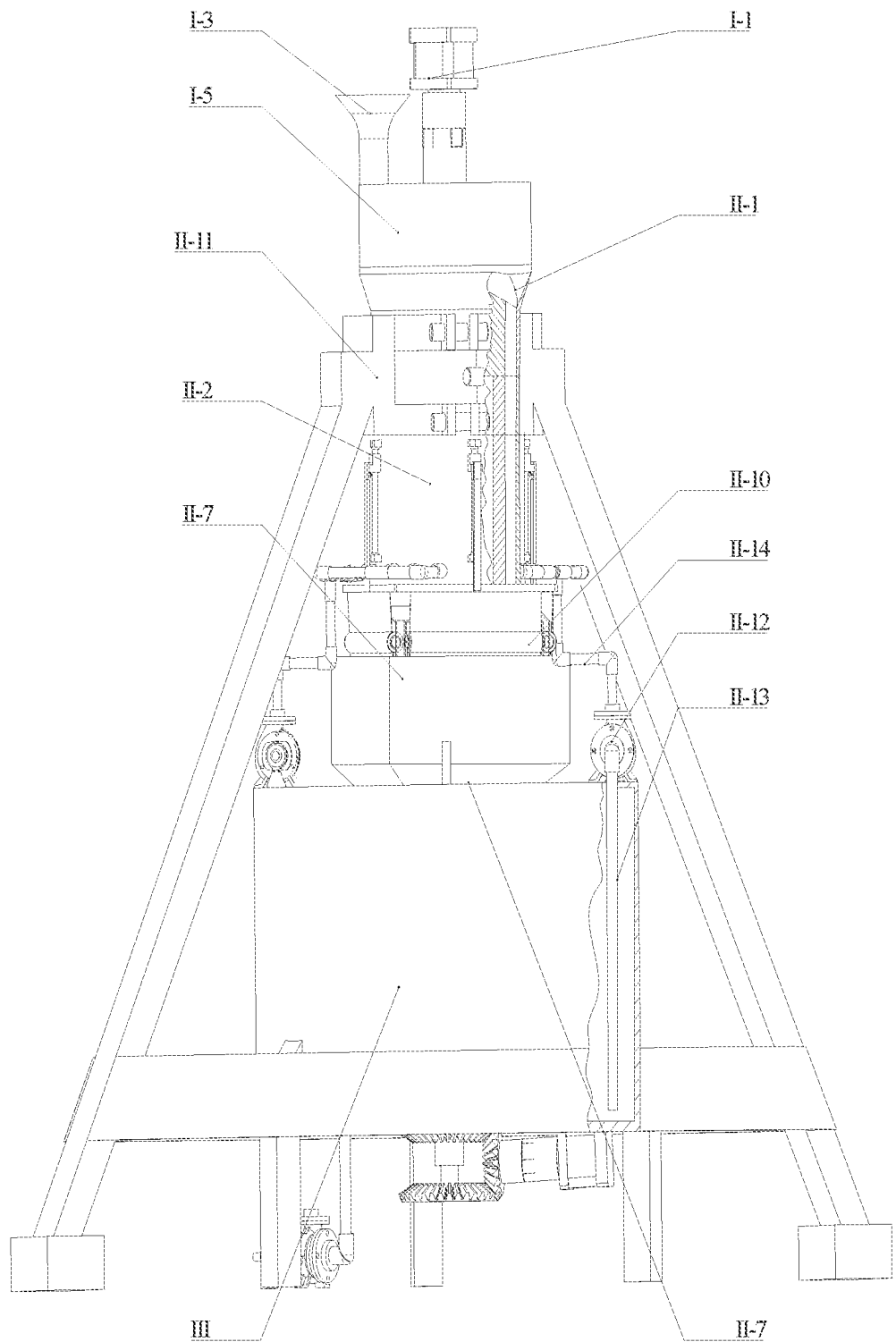
FIG. 10 is a schematic view of an overall structure according to Embodiment 2 of the present invention.

The present embodiment discloses a water and fertilizer mixing device for mixing fertilizer and water to form an aqueous fertilizer solution, as shown in FIG. 10. The water and fertilizer mixing device includes the fertilizer grinding mechanism described in Embodiment 1. The fertilizer grinding mechanism is fixed by a bracket II-11.

Figure 11:
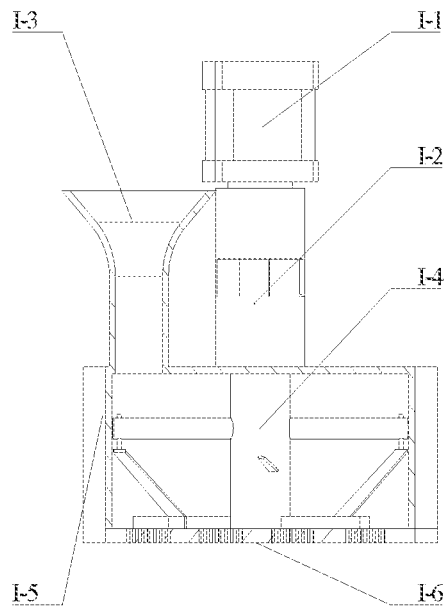
FIG. 11 is a schematic structural view of a crushing mechanism according to Embodiment 2 of the present invention.

A crushing mechanism I is arranged above the fertilizer grinding mechanism, as shown in FIG. 11. The crushing mechanism includes a first housing I-5. A bottom of the first housing is opened, and is provided with a filter screen I-6. The filter screen is welded and fixed to a mounting surface on the top of the fertilizer receiving body. Fertilizer falling after passing through the filter screen can enter the fertilizer receiving body.

A crushing shaft I-4 is arranged inside the first housing. A crushing blade is fixed to the crushing shaft. The crushing shaft is connected to an electric motor I-1 located above the first housing via a shaft coupler I-2. The electric motor can drive the crushing shaft to rotate, so as to crush fertilizer inside the first housing. A top of the first housing is also provided with a feeding pipe I-3 communicated with an inner space of the first housing for adding fertilizer to be crushed into the first housing.

A mixing mechanism is arranged below the inner grinding block. A top of the mixing mechanism is connected with a fertilizer dispersing structure. Ground fertilizer falling after passing through the fertilizer grinding mechanism can be introduced into the mixing mechanism via the fertilizer dispersing mechanism. The mixing mechanism is configured to mix fertilizer and water to form an aqueous fertilizer solution.

Figure 13:
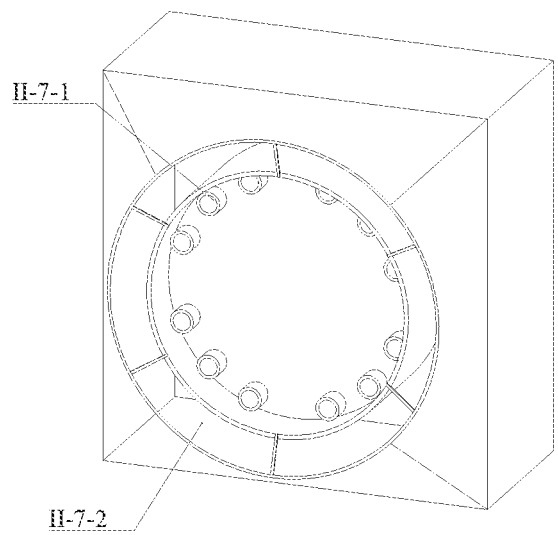
FIG. 13 is a schematic structural view of a fertilizer dispersing mechanism according to Embodiment 2 of the present invention.

As shown in FIG. 13, the fertilizer dispersing mechanism II-7 adopts a shell structure. A bottom of the fertilizer dispersing mechanism is provided with an inverted cone-shaped shell. The inverted cone-shaped shell is connected to a feeding hole of the mixing mechanism to form a discharge hole II-7-2 for introducing the ground fertilizer into the mixing mechanism. A cooling water pipe mounting plate is also connected into the fertilizer dispersing mechanism via a connecting plate. The cooling water pipe mounting plate is closely attached to a lower surface of the inner grinding block. The cooling water pipe mounting plate is provided with a cooling water pipe II-7-1. The cooling water pipe is aligned with the cooling liquid flow passage of the inner grinding block to feed a cooling liquid flowing out of the cooling liquid flow passage to the mixing mechanism.

Figure 12:
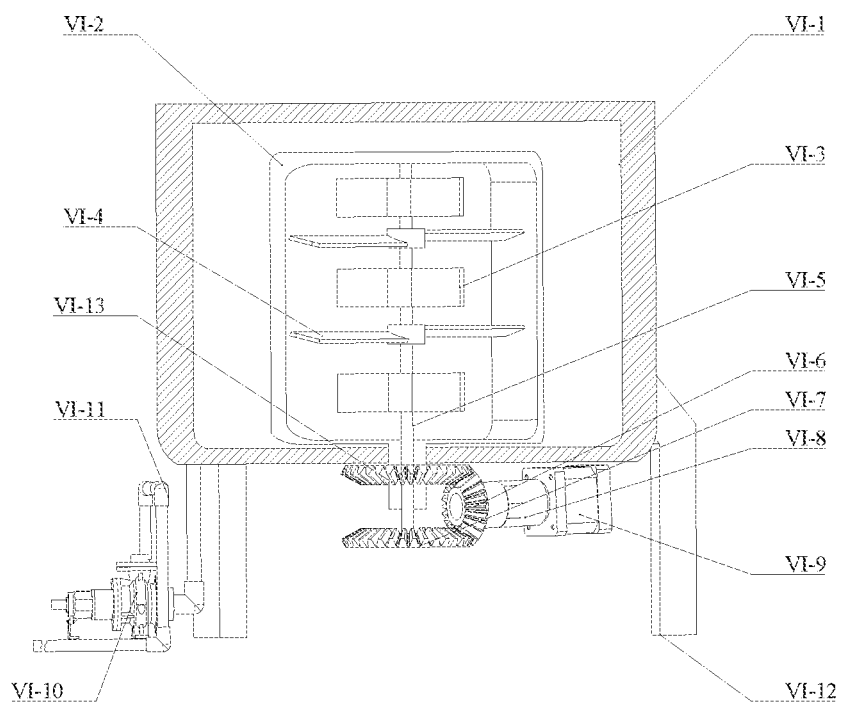
FIG. 12 is a schematic structural view of a mixing mechanism according to Embodiment 2 of the present invention.

As shown in FIG. 12, the mixing mechanism III includes a second housing VI-1. A top of the second housing is provided with a feeding hole. The second housing is fixed to the bracket via a support block VI-12. A stirring shaft VI-5 is arranged inside the second housing. A plurality of groups of long stirring blades VI-4 and short stirring blades VI-3 are alternately arranged on the stirring shaft along an axis of the stirring shaft. The long and short here only mean that the long stirring blades are longer than the short stirring blades, and the sizes of the blades are not limited.

A stirring frame VI-2 is arranged outside the long stirring blades and the short stirring blades. A stirring frame rotating shaft is arranged at a bottom of the stirring frame. The stirring frame rotating shaft is rotatably connected to a bottom of the second housing via a bearing.

The stirring frame rotating shaft is connected with a first bevel gear VI-13. The stirring shaft runs through the stirring frame rotating shaft to be connected with a second bevel gear VI-7. The first bevel gear and the second bevel gear are distributed up and down. Both the first bevel gear and the second bevel gear are meshed with a third bevel gear VI-6 and are meshed with upper and lower portions of the third bevel gear respectively. The third bevel gear is connected with an electric motor VI-9 via a shaft coupler VI-8. The electric motor drives the first bevel gear and the second bevel gear to rotate via the third bevel gear, thereby driving the stirring shaft and the stirring frame to rotate in opposite directions. The water and fertilizer in the second housing are stirred and mixed by the long stirring blades, the short stirring blades, and the stirring frame.

The top of the second housing is provided with water suction pumps II-12. Water inlet pipes II-13 of the water suction pumps are communicated with an inner space of the second housing. Water outlet pipes of the water suction pumps are connected with the cooling liquid flow passages of the connecting body. In the present embodiment, two water suction pumps are arranged. The water outlet pipe of one of the water suction pumps is connected to six cooling liquid flow passages, and the water outlet pipe of the other water suction pump is connected to the other six cooling liquid flow passages.

The water suction pumps II-12 can feed the aqueous fertilizer solution in the second housing into the cooling liquid flow passages to serve as a cooling medium for fertilizer grinding. The aqueous fertilizer solution flowing out of the cooling liquid flow passages can flow back into the second housing via a cooling liquid pipe of the fertilizer dispersing mechanism.

The second housing is also connected with water suction pumps VI-10 via liquid outlet pipes VI-11. The aqueous fertilizer solution stirred in the second housing can be pumped out by the water suction pumps via the liquid outlet pipes, so as to enter a next procedure.

The operating principle of the water and fertilizer mixing device of the present embodiment is as follows.

Fertilizer is added into the first housing via the feeding pipe. The crushing shaft rotates, and the crushing blades are utilized to crush the fertilizer. The crushed fertilizer enters the fertilizer grinding mechanism after being filtered by the filter screen. The fertilizer grinding mechanism grinds the fertilizer. The ground fertilizer enters the mixing mechanism via the fertilizer dispersing mechanism. A set amount of water is added into the second housing in advance. After the ground fertilizer enters the water, the stirring shaft and the stirring frame rotate in opposite directions to stir the water and the fertilizer. The fertilizer is dissolved in the water to form an aqueous fertilizer solution. After stirring is carried out for a set time, the stirred aqueous fertilizer solution is pumped out by the water section pump VI-10, so as to enter a next procedure.

Embodiment 3

Figure 14:
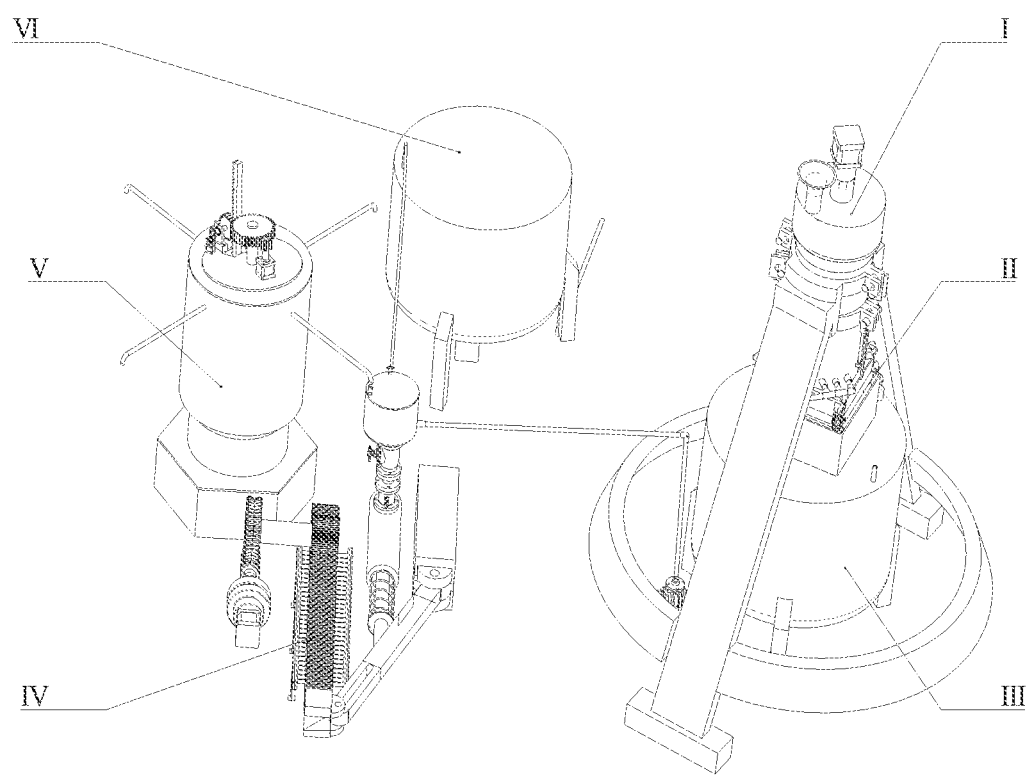
FIG. 14 is a schematic structural view of a production line according to Embodiment 3 of the present invention.

The present embodiment discloses an aqueous fertilizer solution preparation production line, as shown in FIG. 14. The aqueous fertilizer solution preparation production line includes the water and fertilizer mixing device described in Embodiment 2, a solution feeding device IV, and a solution diluting device VI arranged in sequence.

The water and fertilizer mixing device is connected with the solution feeding device via a pipeline. The solution feeding device is connected with the solution diluting device via a pipeline. The water and fertilizer mixing device feeds a well-mixed aqueous fertilizer solution to the solution feeding device. The solution feeding device feeds a set amount of aqueous fertilizer solution to the solution diluting device for dilution.

A structure of the solution diluting device is exactly the same as a structure of the mixing mechanism, except that no water suction pump needs to be arranged on the top of the second housing, which will not be repeated here.

The production line also includes a nutrient solution supply device for adding a set amount of nutrient solution to the solution feeding device.

Figure 15:
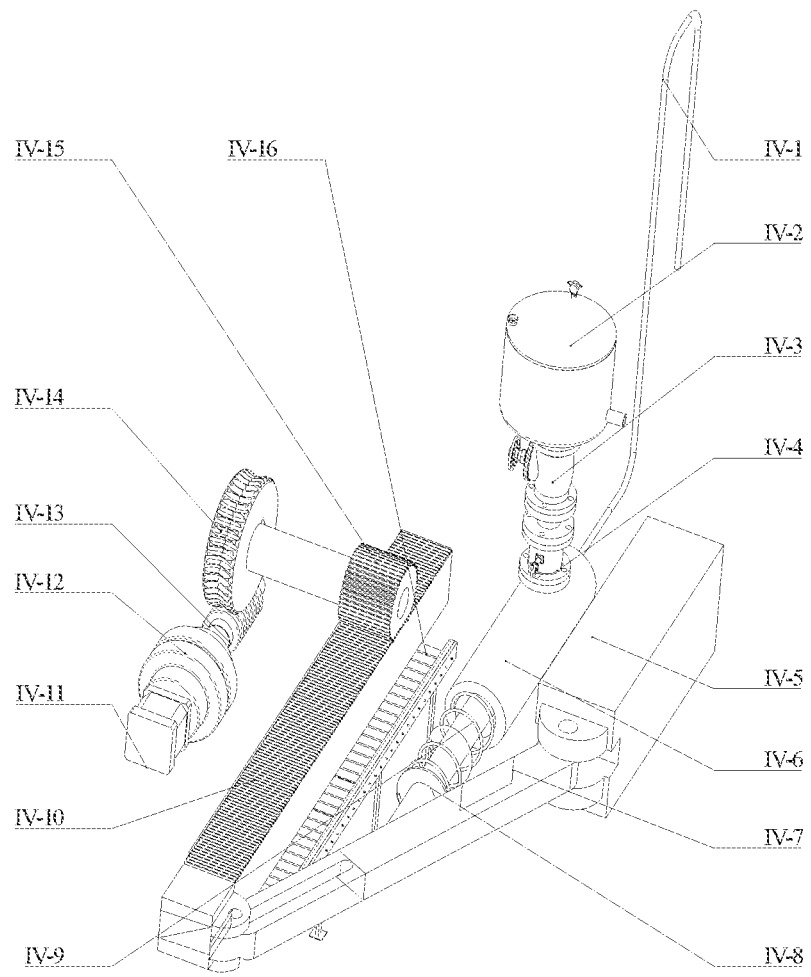
FIG. 15 is a schematic structural view of a solution feeding device according to Embodiment 3 of the present invention.
Figure 16:
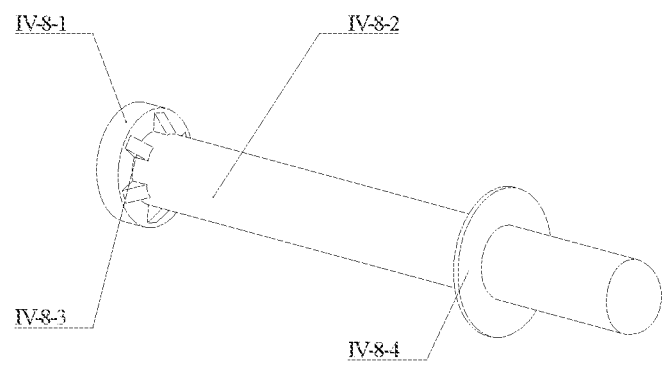
FIG. 16 is a schematic structural view of a pushing member according to Embodiment 3 of the present invention.
Figure 17:
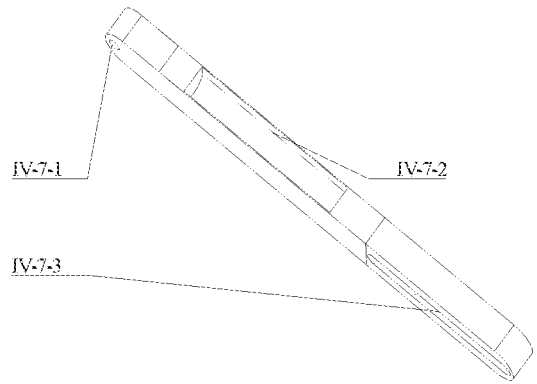
FIG. 17 is a schematic structural view of a lever according to Embodiment 3 of the present invention.

As shown in FIG. 15, the solution feeding device includes a pushing shell IV-6. The pushing shell is provided with a pushing member IV-8 which can move along an axis of the pushing shell. As shown in FIG. 16 and FIG. 17, the pushing member includes a pushing piston IV-8-1 arranged inside the pushing shell. The pushing piston is connected with a piston rod IV-8-2. The piston rod extends out of the pushing shell. A plurality of stiffening plates IV-8-3 are arranged between the pushing piston and the piston rod. A portion of the piston rod extending out of the pushing shell is provided with a baffle IV-8-4. An elastic member is arranged between the baffle and an end of the pushing shell. The elastic member adopts a spring IV-9.

An end of the piston rod extending out of the pushing shell adopts a hemispherical structure. The hemispherical structure is in sliding contact with a lever via a first sliding groove IV-7-2 arranged in the lever IV-7. The hemispherical structure is in sliding contact with a bottom groove surface of the first sliding groove.

One end of the lever is hinged to a positioning block via a hinge hole IV-7-1, and the other end of the lever is provided with a second sliding groove IV-7-3. A hinge shaft runs through the second sliding groove. The hinge shaft is hinged to one end of a first rack IV-10. The first rack is meshed with a first gear IV-15. The first gear IV-15 is connected with a worm gear shaft. A worm gear IV-14 is connected to the worm gear shaft. The worm gear is meshed with a worm IV-13. The worm is connected with an electric motor IV-11 via a shaft coupler IV-12.

The pushing piston divides an internal space of the pushing shell into a rod cavity and a rodless cavity. The rod cavity refers to a cavity where the piston rod is located. The rodless cavity is connected with a solution conveying pipeline IV-1. The rodless cavity is also connected with a solution buffer tank IV-2 via a pipeline. The solution buffer tank is arranged directly above the pushing shell. An electromagnetic valve IV-3 and a flowmeter IV-4 are arranged on the pipeline between the solution buffer tank and the pushing shell. The solution buffer tank is connected with the water suction pump VI-10 of the mixing mechanism via a pipeline. A liquid level sensor is also arranged in the solution buffer tank.

The solution feeding device also includes a feeding auxiliary mechanism IV-16. The feeding auxiliary mechanism includes an auxiliary frame body. The auxiliary frame body is rotatably connected with a plurality of rotating rollers. The rotating rollers are in contact with a lower surface of the first rack for supporting the first rack.

The operating principle of the solution feeding device of the present embodiment is as follows.

Figure 18:
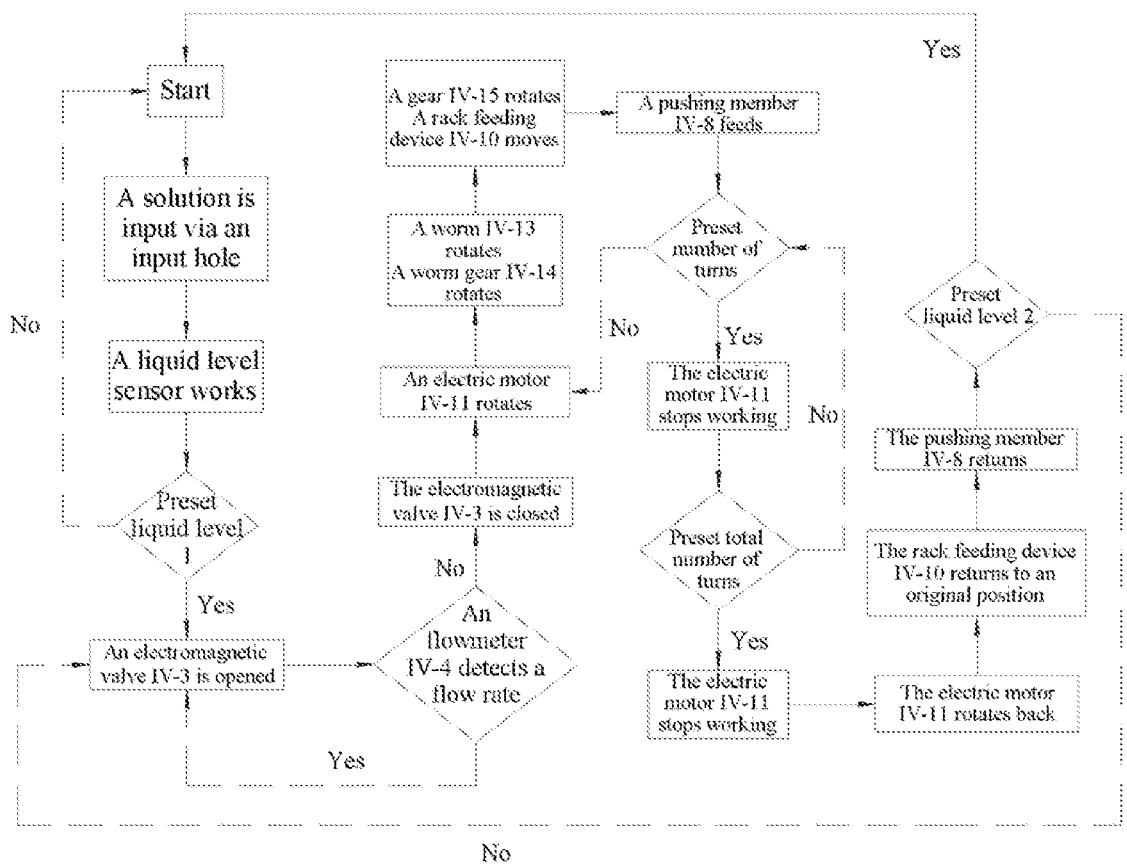
FIG. 18 is a schematic operating principle drawing of the solution feeding device according to Embodiment 3 of the present invention.
Figure 19:
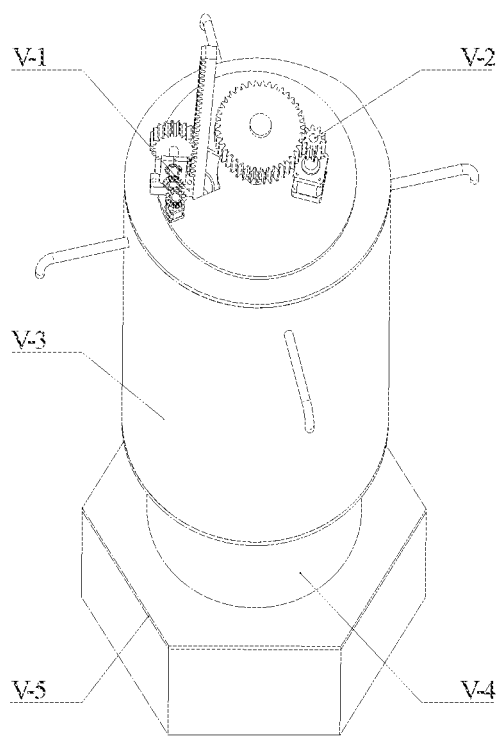
FIG. 19 is a schematic structural view of a nutrient solution supply device according to Embodiment 3 of the present invention.
Figure 20:
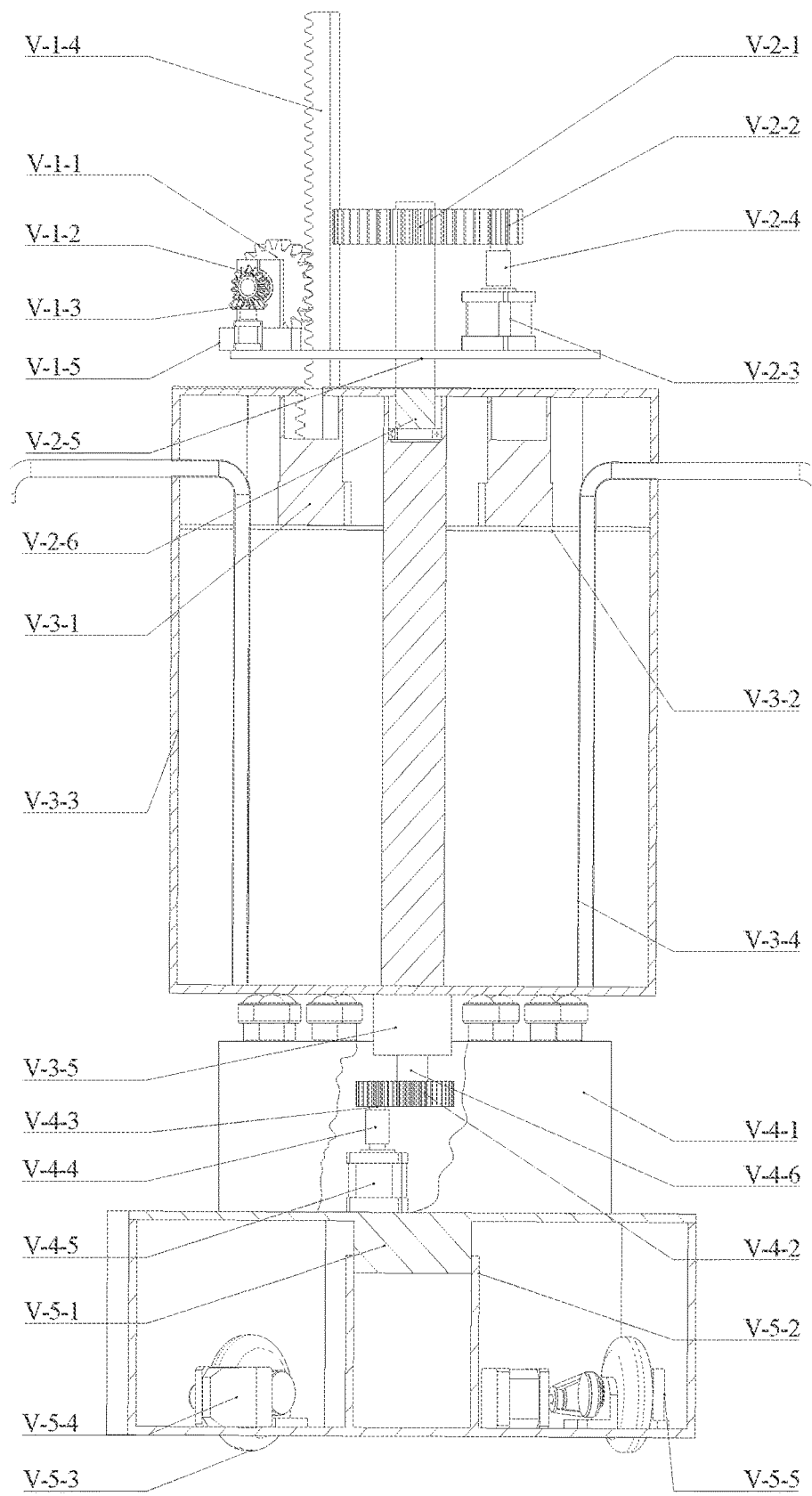
FIG. 20 is a cross-sectional view of the nutrient solution supply device according to Embodiment 3 of the present invention.
Figure 21:
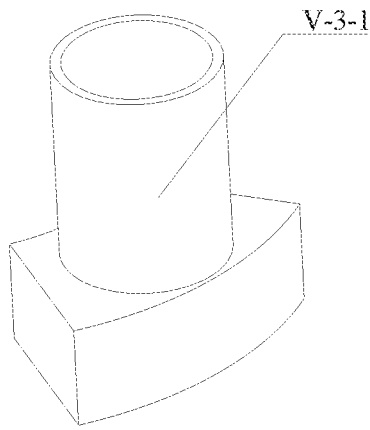
FIG. 21 is a schematic structural view of a feeding auxiliary block according to Embodiment 3 of the present invention.
Figure 22:
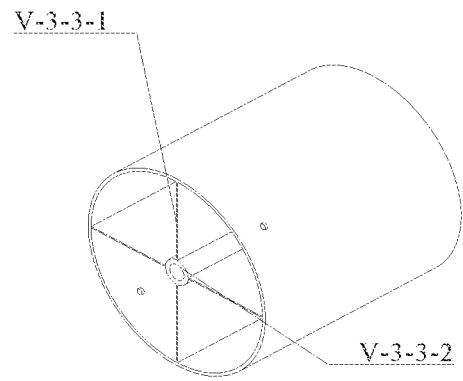
FIG. 22 is a schematic structural view of a buffer container according to Embodiment 3 of the present invention.
Figure 23:
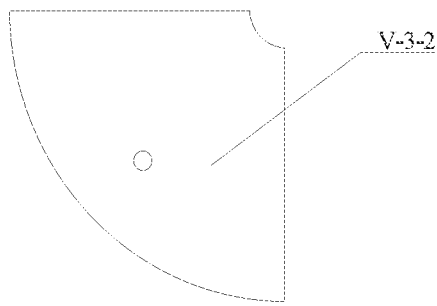
FIG. 23 is a schematic structural view of a feeding plate according to Embodiment 3 of the present invention.
Figure 24:
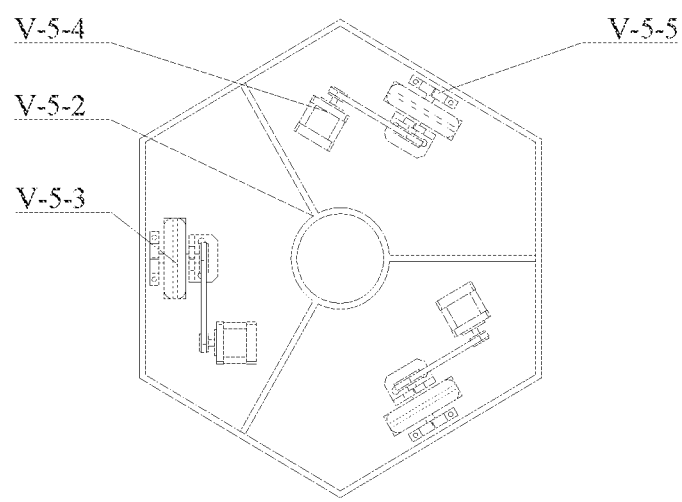
FIG. 24 is a schematic structural view of a traveling mechanism according to Embodiment 3 of the present invention.

As shown in FIG. 18, the water and fertilizer mixing device injects the aqueous fertilizer solution into the solution buffer tank via the water suction pumps. The electromagnetic valve is opened, and the aqueous fertilizer solution enters the pushing shell. When no flow is detected by the flowmeter, it is proved that the pushing shell is full of the aqueous fertilizer solution. The electromagnetic valve is closed. The electric motor drives the first gear to rotate via the worm gear and the worm. The first gear drives the first rack to move, the first rack drives the piston rod and the pushing piston to move along the axis of the pushing shell via the lever, so as to press the aqueous fertilizer solution in the pushing shell out via the solution conveying pipe. The number of turns of the first gear can be controlled to control a moving distance of the first rack, and then control a moving distance of the pushing piston, thereby controlling the discharge amount of the aqueous fertilizer solution, and achieving precise control of the discharge amount of the aqueous fertilizer solution.

When the first rack returns to the initial position, under the action of the spring, the piston rod and the pushing piston return to their original positions, so that the piston rod is always in contact with the lever via the first sliding groove.

As shown in FIG. 19 to FIG. 24, the nutrient solution supply device includes a solution buffer mechanism V-3. A bottom of the solution buffer mechanism is connected with a rotating mechanism V-4. The rotating mechanism is connected with a traveling mechanism V-5. A top of the solution buffer mechanism is provided with a micro-feeding mechanism V-1 and a micro-feeding mechanism rotating mechanism V-2.

The solution buffer mechanism includes a buffer container V-3-3. A central column V-3-3-2 is arranged at the center of the inside of the buffer container. The central column is connected to one end of each of a plurality of solution baffles V-3-3-1. The other ends of the solution baffles are fixed to an inner wall of the buffer container. The solution baffles divide an internal space of the buffer container into a plurality of chambers for containing different kinds of nutrient solutions. In the present embodiment, four solution baffles are arranged, an included angle between adjacent solution baffles is 90°, and the buffer container is divided into four chambers.

A feeding plate V-3-2 which can move along an axis of the buffer container is arranged in each chamber. An upper surface of the feeding plate is fixed to a bottom surface of a feeding auxiliary block V-3-1. Each chamber is provided with a pipeline V-3-4. One end of the pipeline is communicated with the chamber, and the other end is communicated with an external space. The feeding plates move along the axis of the buffer container, which can press the nutrient solutions in the chambers out via the pipelines.

The rotating mechanism includes a rotating auxiliary column V-4-1. A top of the rotating auxiliary column is rotatably connected with the connecting block via a bearing. The connecting block is fixed to a bottom of the buffer container and is arranged coaxially with the buffer container.

The connecting block is connected with a big gear V-4-2 via a shaft V-4-6. The big gear is meshed with a small gear V-4-3. The small gear is connected with an electric motor V-4-5 via a shaft coupler V-4-4. The big and small here only mean that the big gear is larger than the small gear, and specific sizes of the gears are not limited. The rotating auxiliary column and the electric motor are both fixed to the traveling mechanism. The top of the rotating auxiliary column is also provided with a plurality of universal wheels V-4-7. The universal wheels are in contact with the bottom surface of the buffer container to support the buffer container.

The traveling mechanism includes a traveling mechanism housing. The traveling mechanism housing includes a base V-5-2. A top cover V-5-1 is buckled on the base. The base is rotatably connected with a plurality of traveling wheels V-5-3 via support frames V-5-5. The traveling wheels are connected to an electric motor V-5-4 arranged on the base via a belt transmission mechanism. The electric motor can drive the traveling wheels to rotate via the belt transmission mechanism, thereby achieving traveling of the traveling mechanism. In the present embodiment, the plurality of traveling wheels are arranged tangentially to a same circle.

The micro-feeding mechanism rotating mechanism includes a rotating disc V-2-5. The micro-feeding mechanism is arranged on the rotating disc. The rotating disc is rotatably connected with the central column via a rotating shaft V-2-6. A big gear V-2-1 is fixed to a top end of the rotating shaft. The big gear is meshed with a small gear V-2-2. The small gear is connected to an electric motor V-2-3 via a shaft coupler V-2-4. The electric motor drives the small gear to rotate. The small gear can revolve around the big gear under the action of meshing with the big gear, and then drive the rotating disc to rotate, and thereby the micro-feeding mechanism switches between different chambers of the buffer container.

The micro-feeding mechanism includes a vertically arranged second rack V-1-4. The second rack runs through the rotating disc and is slidably connected with the rotating disc. The second rack is meshed with a second gear V-1-1. The second gear is connected with a first bevel gear V-1-2. The first bevel gear is meshed with a second bevel gear V-1-3. The second bevel gear is connected with an electric motor V-1-5. The electric motor can drive the second rack to lift via the second gear. The second rack can run through an opening at the top of the buffer container and is in contact with a top surface of the feeding auxiliary block. The second rack can drive the feeding auxiliary block and the feeding plate to move downwards, thereby discharging the nutrient solution via the pipeline. The number of turns of the second gear can be controlled to accurately control the discharge amount of the nutrient solution.

The operating principle of the nutrient solution supply device of the present embodiment is as follows.

Figure 25:
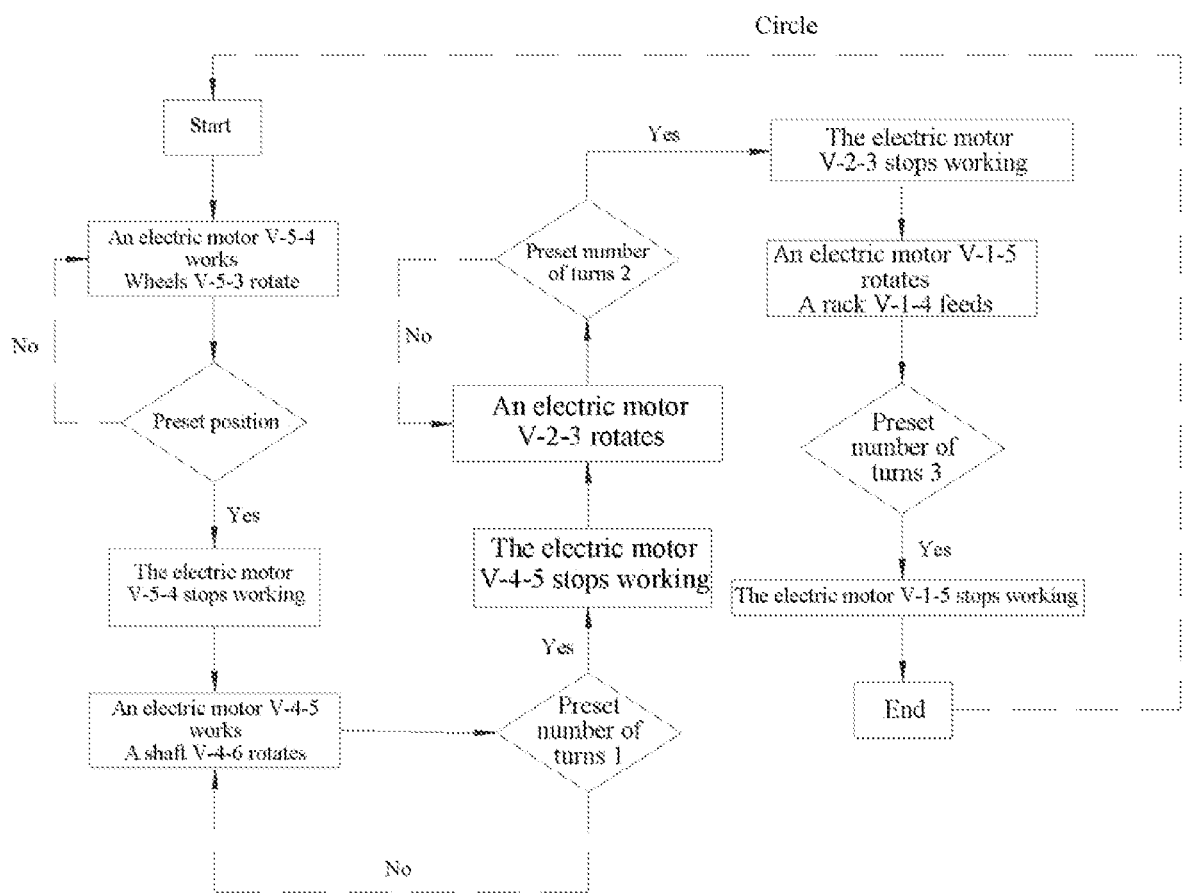
FIG. 25 is an operating principle diagram of the nutrient solution supply device according to Embodiment 3 of the present invention.

As shown in FIG. 25, the traveling mechanism drives the entire nutrient solution supply device to move to a set position, the rotating mechanism works, thus a pipeline corresponding to the chamber of a required nutrient solution moves to just above the solution buffer tank, the micro-feeding mechanism rotating mechanism works to drive the second rack to move above the corresponding chamber, and the second rack moves downwards to discharge a set amount of nutrient solution into the solution buffer tank via the pipeline.

The solution diluting device dilutes and stirs the solution fed from the solution feeding device, and then the diluted aqueous fertilizer solution is discharged via a water suction pump. A structure of the solution diluting device is the same as the structure of the mixing mechanism, and will not be described in detail here.

The operating principle of the production line of the present embodiment is as follows.

The water and fertilizer mixing device feeds the produced aqueous fertilizer solution into the solution buffer tank via the water suction pump, and meanwhile, utilizes the nutrient solution supply device to add a set amount of nutrient solution into the solution buffer tank. The electromagnetic valve is opened, the aqueous fertilizer solution in the solution buffer tank enters the pushing shell. The first rack moves, and the set amount of aqueous fertilizer solution in the pushing shell is driven by the lever and the pushing piston to enter the solution diluting device for further dilution, and then the diluted aqueous fertilizer solution is discharged by the solution diluting device.

The whole process is automated, the labor intensity of workers is greatly reduced, and the working efficiency is improved.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A fertilizer grinding mechanism, comprising:
   a fertilizer receiving body, wherein an edge of the fertilizer receiving body is provided with a vertically arranged first channel;
   a connecting body, wherein the connecting body is fixed to a bottom of the fertilizer receiving body and provided with a second channel communicated with the first channel, a bottom of the second channel is communicated with a buffer bin, a pushing block is arranged in the buffer bin, and the pushing block is connected with a drive mechanism for driving the pushing block to move in a radial direction of the connecting body; and
   an inner grinding block, wherein the inner grinding block is fixed to a bottom of the connecting body, an outer side of the inner grinding block is provided with a vertically movable grinding roller, the pushing block can push fertilizer falling into the buffer bin to a gap between the inner grinding block and the grinding roller so that the fertilizer is ground under vertical movement of the grinding roller.

2. The fertilizer grinding mechanism according to claim 1, wherein the drive mechanism comprises a pushing column, a top end of the pushing column is connected with a first vertical drive member, the pushing column is hinged to one end of a pull rod, the other end of the pull rod is hinged to the pushing block, a bottom end of the pushing column can be in contact with the pushing block via an arc surface so that vertical movement of the pushing column can be converted into movement of the pushing block in the radial direction of the connecting body.

3. The fertilizer grinding mechanism according to claim 1, wherein a second vertical drive member is fixed to an outer peripheral surface of the connecting body, the second vertical drive member is connected with a grinding roller support, and the grinding roller is mounted on the grinding roller support.

4. The fertilizer grinding mechanism according to claim 3, wherein the second vertical drive member is connected with the grinding roller support via a fine-adjusting mechanism, the fine-adjusting mechanism can drive the grinding roller support to move in the radial direction of the connecting body so that a distance between the grinding roller and an outer side surface of the inner grinding body can be adjusted.

5. The fertilizer grinding mechanism according to claim 1, wherein cooling liquid flow passages communicated with each other are arranged in the connecting body and the inner grinding block.

6. A water and fertilizer mixing device, comprising a crushing mechanism, the fertilizer grinding mechanism according to claim 1, a fertilizer dispersing mechanism, and a mixing mechanism;
wherein the crushing mechanism is arranged above the fertilizer grinding mechanism and is configured to crush fertilizer and feed the crushed fertilizer to the fertilizer grinding mechanism, the fertilizer dispersing mechanism is fixed to a top of the mixing mechanism and arranged below the fertilizer grinding mechanism, the fertilizer dispersing mechanism is configured to introduce the ground fertilizer into the mixing mechanism, and the mixing mechanism is configured to mix the ground fertilizer and water.

7. The water and fertilizer mixing device according to claim 6, wherein the fertilizer dispersing mechanism adopts a shell structure, the inner grinding block extends into the fertilizer dispersing mechanism, a bottom of the fertilizer dispersing mechanism is of an inverted cone-shaped structure, a bottom end of the inverted cone-shaped structure is provided with a discharge port, and the fertilizer dispersing mechanism is communicated with the mixing mechanism via the discharge port.

8. An aqueous fertilizer solution preparation production line, comprising: the water and fertilizer mixing device according to claim 7, a solution feeding device, and a solution diluting device arranged in sequence, wherein the solution feeding device can receive an aqueous fertilizer solution fed from the water and fertilizer mixing device, and feed the aqueous fertilizer solution to the solution diluting device, and the solution diluting device is configured to dilute the aqueous fertilizer solution.

9. The aqueous fertilizer solution preparation production line according to claim 8, wherein the solution feeding device comprises a pushing shell, a discharge hole of the pushing shell is communicated with the solution diluting device, a feeding hole is connected with the water and fertilizer mixing device, a pushing member capable of moving along an axis of the pushing shell is arranged in the pushing shell, an elastic member is arranged between the pushing member and the pushing shell, an end of the pushing member extending out of the pushing shell is in sliding contact with a lever via a first sliding groove arranged in the lever, one end of the lever is hinged to a positioning block, the other end of the lever is provided with a second sliding groove, a hinge shaft is slidably connected into the second sliding groove, the hinge shaft is hinged to a first rack, and the first rack is meshed with a rotatable first gear.

10. The aqueous fertilizer solution preparation production line according to claim 8, further comprising a nutrient solution supply device, wherein the nutrient solution supply device comprises a buffer container, the buffer container is communicated with a discharge pipe, a pushout component is arranged in the buffer container, the pushout component can be in contact with a vertically movable second rack, the second rack can discharge a nutrient solution in the buffer container via the discharge pipe by the pushout component, and the second rack is meshed with a rotatable second gear.

* * * * *